(12) United States Patent
Oh

(10) Patent No.: US 9,571,521 B2
(45) Date of Patent: Feb. 14, 2017

(54) METHOD FOR PROCESSING DATA AND ELECTRONIC DEVICE THEREFOR

(71) Applicant: Samsung Electronics Co., Ltd., Suwon-si, Gyeonggi-do (KR)

(72) Inventor: Myeong-Jin Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/687,314

(22) Filed: Apr. 15, 2015

(65) Prior Publication Data

US 2015/0304353 A1  Oct. 22, 2015

(30) Foreign Application Priority Data

Apr. 17, 2014  (KR) .................. 10-2014-0046041

(51) Int. Cl.
*G06F 11/00*  (2006.01)
*H04L 29/06*  (2006.01)

(52) U.S. Cl.
CPC .................... *H04L 63/1466* (2013.01)

(58) Field of Classification Search
CPC .............. H04L 63/1466; H04L 67/10
USPC ........................................... 726/23
See application file for complete search history.

(56) References Cited

U.S. PATENT DOCUMENTS

| | | |
|---|---|---|
| 8,387,141 B1 | 2/2013 | Zhukov et al. |
| 2003/0163539 A1* | 8/2003 | Piccinelli ............ G06Q 10/107 709/206 |
| 2005/0283837 A1* | 12/2005 | Olivier .................. H04L 63/145 726/24 |
| 2007/0087765 A1 | 4/2007 | Richardson et al. |
| 2008/0292101 A1 | 11/2008 | Macchi |
| 2011/0244830 A1 | 10/2011 | Chesnutt et al. |

* cited by examiner

*Primary Examiner* — Mohammad W Reza
(74) *Attorney, Agent, or Firm* — Jefferson IP Law, LLP

(57) ABSTRACT

A method for preventing a message from being modified or deleted by a malicious application when the message is received by an electronic device based on a service provided in the electronic device and an electronic device therefor are provided. The method includes successively loading at least two received messages in a sequence filter, and determining whether data of the at least two received messages are identical to each other. A method for operating an electronic device is not limited to the above method, and other embodiments are possible within the same or similar scope as the present disclosure.

20 Claims, 10 Drawing Sheets

| Address | App | |
|---|---|---|
| 000127 | Message Protection | ~301 |
| 000198 | Message App #1 | ~303 |
| 000777 | Message App #2 | ~305 |
| ⋮ | ⋮ | |
| 56021 | Message Protection | |

MESSAGE FILTER LOAD PRIORITY 300

FIG.3A

METHOD FOR PROCESSING DATA AND ELECTRONIC DEVICE THEREFOR

CROSS-REFERENCE TO RELATED APPLICATION(S)

This application claims the benefit under 35 U.S.C. §119 (a) of a Korean patent application filed on Apr. 17, 2014 in the Korean Intellectual Property Office and assigned Serial number 10-2014-0046041, the entire disclosure of which is hereby incorporated by reference.

TECHNICAL FIELD

The present disclosure relates to a method for processing received data in an electronic device and to an electronic device therefor.

BACKGROUND

When a message is received by an electronic device, a malicious application included in the electronic device may intercept and modify or delete the message. To prevent a message from being modified or deleted by a malicious application in an electronic device, some of services provided in the electronic device may not be used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for preventing a message from being modified or deleted by a malicious application when the message is received by an electronic device based on a service provided in the electronic device and an electronic device therefor.

In accordance with an aspect of the present disclosure, a method for preventing a message from being modified is provided. The method includes successively transferring at least two received messages in a sequence filter, and determining whether data of the at least two received messages are identical to each other.

In accordance with another aspect of the present disclosure, an electronic device is provided. The electronic device includes a communication interface configured to receive at least two messages, and a processor configured to control to successively transfer the at least two received messages in a sequence filter, and to determine whether data of the at least two received messages are identical to each other.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B illustrate a method for determining whether a message received by an electronic device is modified according to various embodiments of the present disclosure;

Throughout the drawings, it should be noted that like reference numbers are used to depict the same or similar elements, features, and structures.

DETAILED DESCRIPTION

Figure 1:
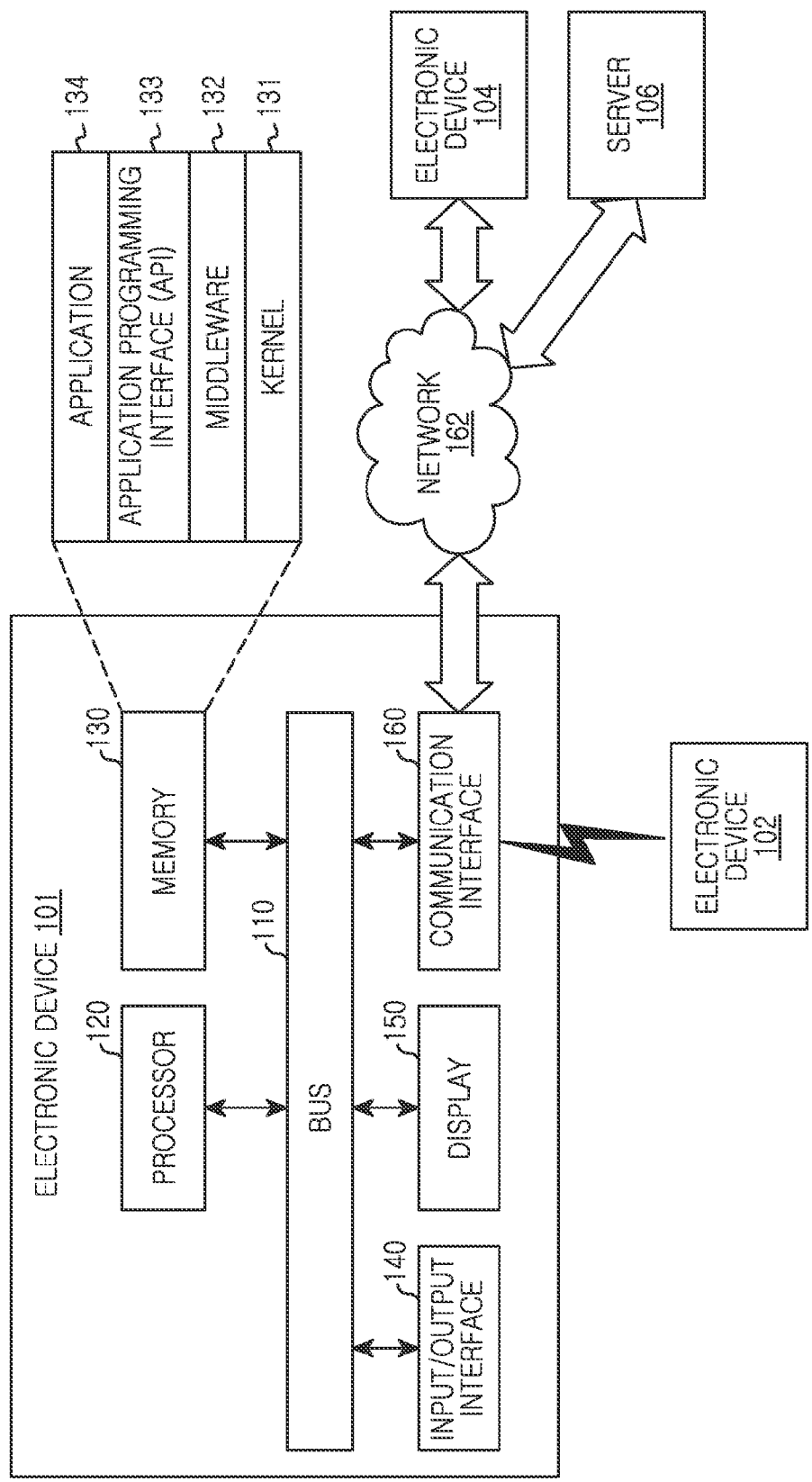
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in various embodiments of the present disclosure, the expression "include" or "may include" refers to the existence of a corresponding function, operation, or element, and does not exclude one or more additional functions, operations, or elements. Further, as used in various embodiments of the present disclosure, the terms "include", "have", and their conjugates are intended merely to denote a certain feature, numeral, operation, element, component, or a combination thereof, and should not be construed to initially exclude the existence of or a possibility of addition of one or more other features, numerals, operations, elements, components, or combinations thereof.

Further, as used in various embodiments of the present disclosure, the expression "or" includes any or all combinations of words enumerated together. For example, the expression "A or B" may include A, B, or both A and B.

As used in various embodiments of the present disclosure, the expressions "first", "second", and the like may modify various elements in the present disclosure, but do not limit the sequence and/or importance of corresponding elements. The above expressions may also be used for the purpose of distinguishing one element from other elements.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are used merely to describe a certain embodiment and are not intended to limit the present disclosure. As used herein, singular forms may include plural forms as well, unless the context explicitly indicates otherwise. Further, all the terms used herein, including technical terms and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device including a communication function. The electronic device according to various embodiments of the present disclosure may, for example, include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group (MPEG-1 or MPEG-2) Audio Layer (MP3) player, a mobile medical device, a camera, a wearable device (e.g., a head-mount-device (HMD) such as electronic glasses, electronic clothing, an electronic bracelet, an electronic necklace, an electronic appcessory, an electronic tattoo, or a smart watch), a television (TV), a digital video disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, medical equipment (e.g., a magnetic resonance angiography (MRA) machine, a magnetic resonance imaging (MRI) machine, a computed tomography (CT) scanner, or an ultrasonic machine), a navigation device, a global positioning system (GPS) receiver, an event data recorder (EDR), a flight data recorder (FDR), a vehicle infotainment device, electronic equipment for a ship (e.g., ship navigation equipment and a gyrocompass), avionics, security equipment, an industrial or home robot, a part of furniture or building/structure, an electronic board, an electronic signature receiving device, a projector, and various measuring instruments (e.g., a water meter, an electricity meter, a gas meter, or a wave meter), each of which includes a communication function. The electronic device according to various embodiments of the present disclosure may be a combination of one or more of the aforementioned various devices. Further, it will be apparent to those skilled in the art that the electronic device according to various embodiments of the present disclosure is not limited to the aforementioned devices.

Hereinafter, an electronic device according to various embodiments of the present disclosure will be described with reference to the accompanying drawings. The term "user" as used in various embodiments of the present disclosure may indicate a person who uses an electronic device or a device (e.g., artificial intelligence electronic device) that uses an electronic device.

FIG. 1 illustrates a network environment including an electronic device according to various embodiments of the present disclosure.

Referring to FIG. 1, an electronic device 101 may include a bus 110, a processor 120, a memory 130, an input/output interface 140, a display 150, and a communication interface 160.

The bus 110 may be a circuit that connects the aforementioned elements to each other and transmits communication signals (e.g., control messages) between the aforementioned elements.

The processor 120 may, for example, receive commands from the above-mentioned other elements (e.g., the memory 130, the input/output interface 140, the display 150, and the communication interface 160) via the bus 110, interpret the received commands, and perform calculations or data processing according to the interpreted commands.

The processor 120 may successively transfer a received message based on a sequence filter and determine whether data of the message successively transferred to the sequence filter are identical to each other.

The processor 120 may include a sequence filter in which a first priority and a second priority assigned to a lower priority than the first priority are occupied by the same program. The processor 120 may assign the first priority to the top priority of the sequence filter and assign the second priority to the last priority of the sequence filter. The processor 120 may store a message, received corresponding to the first priority based on the sequence filter, in a specified location in the memory. The area where the processor 120 stores the message in the memory may be a specified area that has been secured. The processor 120 may determine whether data of the message, including first data of the message transferred to the program corresponding to the first priority and second data of the message transferred to the program corresponding to the second priority, are identical to each other. The processor 120 may determine whether the first data and the second data are identical to each other. When the program occupies a third priority satisfying a lower priority than the first priority and a higher priority than the second priority in the sequence filter, the processor 120 may determine whether third data of the message transferred to the program corresponding to the third priority and the first data are identical to each other. The processor 120 may determine whether data of the message are identical to each other based on a request from a specific program occupying the first priority and the second priority of the sequence filter. The processor 120 may display the result of determining whether data of the message are identical to each other on a display that is functionally connected to the electronic device. The processor 120 may display the original copy of the message on the display.

The memory 130 may store commands or data received from the processor 120 or other elements (e.g., the input/ output interface 140, the display 150, and the communication interface 160) or generated by the processor 120 or other elements. The memory 130 may include programming modules, for example, a kernel 131, middleware 132, an application programming interface (API) 133, an application 134, and the like. Each of the above-mentioned programming modules may be implemented by software, firmware, hardware, or a combination of two or more thereof.

The kernel 131 may control or manage system resources (e.g., the bus 110, the processor 120, or the memory 130) that are used to perform operations or functions implemented in all the other programming modules, for example, the middleware 132, the API 133, or the application 134. Further, the kernel 131 may provide an interface through which the middleware 132, the API 133, or the application 134 may access each element of the electronic device 101 so as to control or manage the element.

The middleware 132 may act as an intermediary so as to allow the API 133 or the application 134 to communicate with and exchange data with the kernel 131. Further, for operation requests received from the application 134, the middleware 132 may control the operation requests (e.g., perform scheduling or load balancing) by using, for example, a method of prioritizing at least one application of the application 134 in using system resources (e.g., the bus 110, the processor 120, the memory 130, and the like) of the electronic device 101.

The API 133 corresponds to an interface used by the application 134 to control a function provided by the kernel 131 or the middleware 132 and may, for example, include at least one interface or function (e.g., instruction) for controlling files, controlling windows, processing images, controlling characters, and others.

The application 134 may correspond to an application associated with information exchange between the electronic device 101 and an external electronic device (e.g., an electronic device 102 or an electronic device 104). The application associated with information exchange may, for example, include a notification relay application for notifying an external electronic device of certain informing or a device management application for managing an external electronic device. According to various embodiments of the present disclosure, the application 134 may include an application that is additionally specified according to the attributes (e.g., the type of electronic device) of an external electronic device (e.g., the electronic device 102 or the electronic device 104).

The input/output interface 140 may transfer a command or data input by a user through a sensor (e.g., acceleration sensor or gyro sensor) or an input/output unit (e.g., keyboard or touch screen) to, for example, the processor 120, the memory 130, the communication interface 160, or the communication interface 160 via the bus 110. The input/output interface 140 may, for example, provide the processor 120 with data corresponding to a user's touch input through a touch screen. Further, the input/output interface 140 may output a command or data, received from, for example, the processor 120, the memory 130, or the communication interface 160 via the bus 110, through an output unit (e.g., speaker or display). The input/output interface 140 may, for example, output voice data processed by the processor 120 to a user through a speaker.

The display 150 may display various pieces of information (e.g., multimedia data or text data) to a user. Further, the display 150 may be implemented as a touch screen into which a command is input when an input means touches or approaches the display.

The communication interface 160 (e.g., the communication module 220) may establish a communication connect between the electronic device 101 and an external device (e.g., the electronic device 104 or the server 106). The communication interface 160 may, for example, be connected to the network 162 via wireless or wired communication so as to communicate with an external device. The wireless communication may, for example, include at least one of wireless fidelity (Wi-Fi), Bluetooth (BT), near field communication (NFC), GPS, and cellular communication (e.g., long term evolution (LTE), LTE-advanced (LTE-A), code division multiple access (CDMA), wideband CDMA (WCDMA), universal mobile telephone system (UMTS), wireless broadband (WiBro), or global system for mobile communications (GSM)). The wired communication may, for example, include at least one of universal serial bus (USB), high definition multimedia interface (HDMI), recommended standard 232 (RS-232), and plain old telephone service (POTS).

According to an embodiment of the present disclosure, the network 162 may be a telecommunication network. The communication network may include at least one of a computer network, the Internet, the Internet of things, and a telephone network. According to an embodiment of the present disclosure, at least one of the applications 134, the API 133, the middleware 132, the kernel 131, and the communication interface 160 may support a protocol (e.g., transport layer protocol, data link layer protocol, or physical layer protocol) for communication between the electronic device 101 and an external device.

Figure 2:
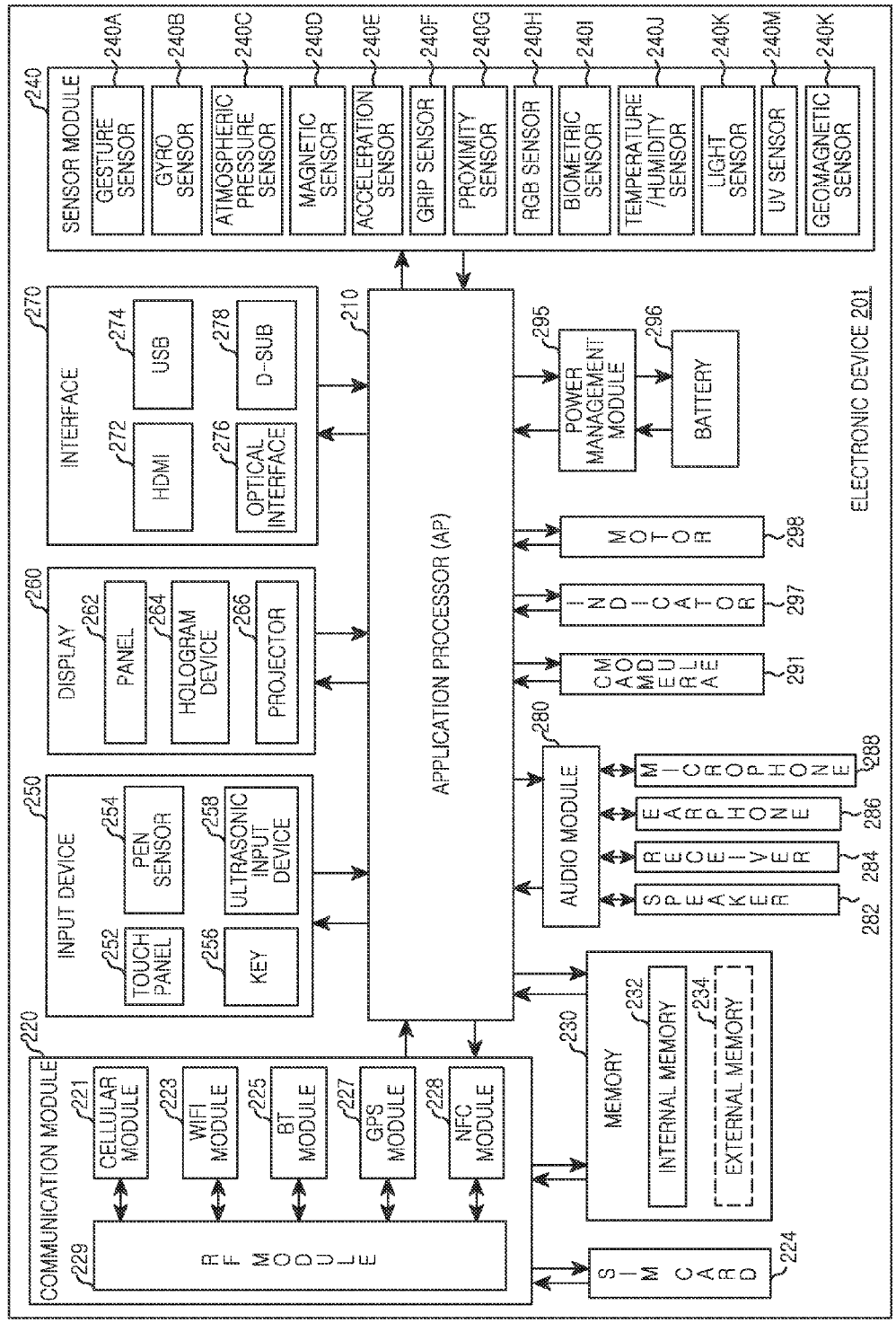
FIG. 2 is a block diagram of an electronic device according to various embodiments of the present disclosure.

FIG. 2 illustrates an electronic device according to various embodiments of the present disclosure.

Referring to FIG. 2, an electronic device 201 may, for example, constitute all or a part of the electronic device 101 shown in FIG. 1. The electronic device 201 may include at least one processor 210, a communication module 220, a subscriber identification module (SIM) card 224, a memory 230, a sensor module 240, an input module 250, a display 260, an interface 270, an audio module 280, a camera module 291, a power management module 295, a battery 296, an indicator 297, and a motor 298.

At least one processor 210 may be included in the electronic device 201 so as to perform predetermined functions of the electronic device 201. According to an embodiment of the present disclosure, the processor 210 may include at least one application processor (AP) and at least one micro controller unit (MCU). According to another embodiment of the present disclosure, the processor 210 may include at least one MCU as an application or may be functionally connected to at least one MCU. Referring to FIG. 2, the AP and the MCU may be incorporated into one integrated circuit (IC) package or may be separately included in different IC packages. According to an embodiment of the present disclosure, one IC package may be implemented by including the MCU in the IC package of the AP. Although FIG. 2 shows the AP or MCU as being included as an element of the processor 210, this is merely an example and it will be apparent that the processor 210 may serves as the AP and/or the MCU.

The AP may control a plurality of hardware or software components connected to the AP by driving an operating system or an application program and may process various data including multimedia data and perform calculations according to the data processing. The AP may, for example, be implemented as a system on chip (SoC). According to an embodiment of the present disclosure, the processor 210 may further include a graphic processing unit (GPU) (not shown).

The MCU may be a processor configured to perform predetermined operations. According to an embodiment of the present disclosure, the MCU may acquire sensing information through at least one specified motion sensor (e.g., a gyro sensor 240B, a acceleration sensor 240E, or a geomagnetic sensor 240K, compare the acquired sensing information, and determine the operational state of the specified motion sensor (e.g., the gyro sensor 240B) by making reference to a database of the electronic device 201. In addition, although FIG. 2 shows the elements of the sensor module 240 as being separate from the MCU, the MCU may be implemented to include at least some of the above elements of the sensor module 240 (e.g., at least one of the gyro sensor 240B, the acceleration sensor 240E, and the geomagnetic sensor 240P) according to an embodiment of the present disclosure.

According to an embodiment of the present disclosure, the AP or the MCU may load a command or data received from at least one of a non-volatile memory and other elements connected to each of the AP and the MCU into a volatile memory and may process the command or data loaded into the volatile memory. Further, the AP or the MCU may store data received from or generated by at least one of other elements in a non-volatile memory.

The communication module 220 may transmit and receive data in communication between the electronic device 201 and any other external device (e.g., the electronic device 104 or the server 106) connected thereto through a network. According to an embodiment of the present disclosure, the communication module 220 may include a cellular module 221, a Wi-Fi module 223, a BT module 225, a GPS module 227, an NFC module 228, and a radio frequency (RF) module 229.

The cellular module 221 may provide a voice call, a video call, a short message service (SMS), or an Internet service through a communication network (e.g., LTE, LTE-A, CDMA, WCDMA, UMTS, WiBro, or GSM). Further, the cellular module 221 may distinguish between and authenticate electronic devices in a communication network using, for example, a SIM (e.g., the SIM card 224). According to an embodiment of the present disclosure, the cellular module 221 may perform at least some of functions that may be provided by the AP 210. The cellular module 221 may, for example, perform at least some of multimedia control functions.

According to an embodiment of the present disclosure, the cellular module 221 may include a communication processor (CP). Further, the cellular module 221 may, for example, be implemented as an SoC. Although FIG. 2 shows the elements such as the cellular module 221 (e.g., CP), the memory 230, and the power management module 295 as being separate from the AP 210, the AP 210 may be implemented to include at least some (e.g., the cellular module 221) of the above elements according to an embodiment of the present disclosure.

According to an embodiment of the present disclosure, the AP 210 or the cellular module 221 (e.g., CP) may load a command or data received from at least one of a non-volatile memory and any other element connected to each of the AP 210 and the cellular module 221 into a volatile memory and may process the command or data loaded into the volatile memory. Further, the AP 210 or the cellular module 221 may store data received from or generated by at least one of other elements in a non-volatile memory.

The Wi-Fi module 223, the BT module 225, the GPS module 227, or the NFC module 228 may, for example, include a processor for processing data transmitted and received through the corresponding module. Although FIG. 2 shows each of the cellular module 221, the Wi-Fi module 223, the BT module 225, the GPS module 227, and the NFC module 228 as being a separate block, at least some (e.g., two or more) of the cellular module 221, the Wi-Fi module 223, the BT module 225, the GPS module 227, and the NFC module 228 may be included in one integrated chip (IC) or one IC package. For example, at least some of the processors corresponding respectively to the cellular module 221, the Wi-Fi module 223, the BT module 225, the GPS module 227, and the NFC module 228 (e.g., the CP corresponding to the cellular module 221 and the Wi-Fi processor corresponding to the Wi-Fi module 223) may be implemented as one SoC.

The RF module 229 may transmit and receive data, for example, RF signals. Although not shown in the drawing, the RF module 229 may, for example, include a transceiver, a power amp module (PAM), a frequency filter, a low noise amplifier (LNA), or the like. Further, the RF module 229 may further include a component for transmitting and receiving an electromagnetic wave in the free airspace in wireless communication, for example, a conductor or a conducting wire. Although FIG. 2 shows the cellular module 221, the Wi-Fi module 223, the BT module 225, the GPS module 227, and the NFC module 228 as sharing one RF module 229, at least one of the cellular module 221, the Wi-Fi module 223, the BT module 225, the GPS module 227, and the NFC module 228 may transmit and receive an RF signal through a separate RF module according to an embodiment of the present disclosure.

The SIM card 224 may be a card in which a SIM is implemented and may be inserted into a slot formed in a predetermined position of the electronic device. The SIM card 224 may include unique identification information (e.g., an integrated circuit card identifier (ICCID)) or unique subscriber information (e.g., an international mobile subscriber identity (IMSI)).

The memory 230 (e.g., the memory 130) may include an internal memory 232 or an external memory 234. The internal memory 232 may, for example, include at least one of a volatile memory (e.g., a dynamic random access memory (DRAM), a static RAM (SRAM), or a synchronous DRAM (SDRAM)) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, or a not or (NOR) flash memory).

According to an embodiment of the present disclosure, the internal memory 232 may be a solid state drive (SSD). The external memory 234 may further include a flash drive, for example, a compact flash (CF), a secure digital (SD), a Micro-SD, a Mini-SD, an extreme digital (xD), a Memory Stick, or the like. The external memory 234 may be functionally connected to the electronic device 201 through various interfaces. According to an embodiment of the present disclosure, the electronic device 201 may further include a storage device (or storage medium) such as a hard drive.

The sensor module 240 may measure a physical quantity or sense an operational state of the electronic device 201 and may convert the measured or sensed information to an electric signal. The sensor module 240 may. For example, include at least one of a gesture sensor 240A, the gyro sensor 240B, an atmospheric pressure sensor 240C, a magnetic sensor 240D, the acceleration sensor 240E, a grip sensor 240F, a proximity sensor 240G, a color sensor 240H (e.g., a red/green/blue (RGB) sensor), a biometric sensor 240I, a temperature/humidity sensor 240J, the geomagnetic sensor 240K, and an ultraviolet (UV) sensor 240M. Additionally or alternatively, the sensor module 240 may, for example, include an E-nose sensor (not shown), an electromyography (EMG) sensor (not shown), an electroencephalogram (EEG) sensor (not shown), an electrocardiogram (ECG) sensor (not shown), an Infrared (IR) sensor (not shown), an iris sensor (not shown), a fingerprint sensor (not shown), and the like. The sensor module 240 may further include a control circuit for controlling at least one sensor included therein.

The input module 250 may include a touch panel 252, a (digital) pen sensor 254, a key 256, or an ultrasonic input unit 258. The touch panel 252 that recognizes a touch input may, for example, include at least one of a capacitive touch panel, a resistive touch panel, an infrared touch panel, and an acoustic wave touch panel. The touch panel 252 may further include a control circuit. The capacitive touch panel may be able to recognize physical contact or proximity. The touch panel 252 may further include a tactile layer. In this case, the touch panel 252 may provide a tactile response to a user.

The (digital) pen sensor 254 may, be implemented using a means identical or similar to a means for receiving a touch input from a user or using a separate recognition sheet. The key 256 may, for example, include a physical button, an optical key, or a keypad. The ultrasonic input unit 258 may be a unit that may identify data by generating an ultrasonic signal through an input tool and detecting a sonic wave through a microphone (e.g., the microphone 288) in the electronic device 201 and may be capable of wireless recognition. According to an embodiment of the present disclosure, the electronic device 201 may receive a user input from an external device (e.g., computer or server) connected thereto using the communication module 220.

The display 260 (e.g., the display 150) may include a panel 262, a hologram unit 264, or a projector 266. The panel 262 may, for example, be a liquid crystal display (LCD) or an active matrix-organic light emitting diode (AM-OLED). The panel 262 may, for example, be implemented to be flexible, transparent, or wearable. The panel 262 and the touch panel 252 may be incorporated into one module. The hologram unit 264 may show a stereoscopic image in the air using light interference. The projector 266 may display an image by projecting light onto a screen. The screen may, for example, be located inside or outside of the electronic device 201. According to an embodiment of the present disclosure, the display 260 may further include a control circuit for controlling the panel 262, the hologram unit 264, or the projector 266.

The interface 270 may, for example, include a HDMI 272, a USB 274, an optical interface 276, or a D-subminiature (D-sub) 278. The interface 270 may, for example, be included in the communication interface 160 shown in FIG. 1. Additionally or alternatively, the interface 270 may, for example, include a mobile high-definition link (MHL) interface, an SD card/multi-media card (MMC) interface, or an infrared data association (IrDA) interface.

The audio module 280 may convert a sound and an electrical signal in a bidirectional manner, that is, may convert a sound to an electrical signal and vice versa. At least some elements of the audio module 280 may, for example, be included in the input/output interface 140 shown in FIG. 1. The audio module 280 may, for example, process sound information input or output through a speaker 282, a receiver 284, earphones 286, or a microphone 288. The camera module 291 may be a device that may take both still and moving images and may include at least one image sensor (e.g., front sensor or rear sensor; not shown), a lens (not shown), an image signal processor (ISP) (not shown), or a flash (e.g., light emitting diode (LED) or xenon lamp; not shown) according to an embodiment of the present disclosure.

The power management module 295 may, for example, include a power management integrated circuit (PMIC), a charger IC, or a battery or fuel gauge. The PMIC may, for example, be mounted in an integrated circuit or an SoC semiconductor. The charging methods may be classified into wired charging and wireless charging. The charger IC may charge a battery and may prevent an overvoltage or excess current from being induced or flowing from a charger.

According to an embodiment of the present disclosure, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, and a rectifier may be added for the wireless charging.

The battery gauge may, for example, measure the residual capacity, charge in voltage, current, or temperature of the battery 296a. The battery 296 may store or generate electricity and may supply power to the electronic device 201 using the stored or generated electricity. The battery 296 may, for example, include a rechargeable battery or a solar battery.

The indicator 297 may display a specific state of the electronic device 201 or a part thereof (e.g., the AP 210), for example, a boot-up state, a message state, or a state of charge (SOC). The motor 298 may convert an electrical signal to a mechanical vibration. Although not shown in the drawing, the electronic device 201 may include a processing unit (e.g., GPU) for supporting a mobile TV. The processing unit for supporting the mobile TV may, for example, process media data pursuant to a certain standard such as digital multimedia broadcasting (DMB), digital video broadcasting (DVB), or media flow.

Each of the above described elements of the electronic device according to various embodiments of the present disclosure may include one or more components, and the name of a corresponding element may vary according to the type of electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

Reference will now be made to various embodiments of a method and apparatus for detecting whether a message received by the electronic device 101 is modified (e.g., an operation of infecting, forging, altering, or deleting the message by a malicious application) in the process of transferring the message to applications by preoccupying (occupying) the priorities of a sequence filter (e.g., message filter) that successively transfers the received message to the applications.

Figure 3B:
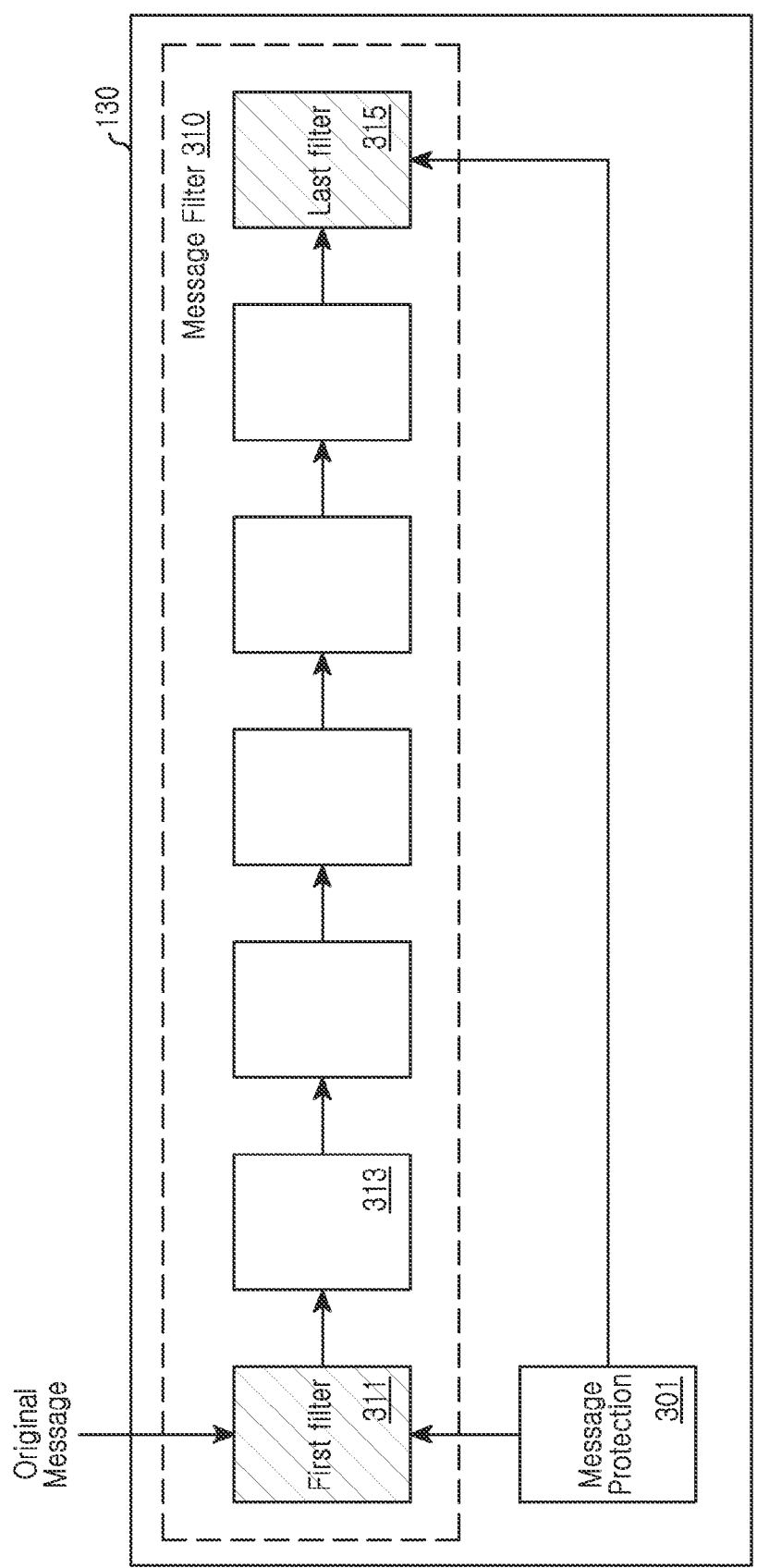

FIGS. 3A and 3B illustrate a method for determining whether a message received by an electronic device is modified according to various embodiments of the present disclosure.

Referring to FIGS. 3A and 3B, upon receiving a message, the electronic device 101 may successively transfer the received message to a message filter in a predetermined order. For example, the message filter may be a sequence filter in which at least one application is loaded (in an operational state or in a ready state) into the memory 130 according to predetermined priorities in order to transfer a certain message to at least one other application in the electronic device 101. In transferring a received message to another application, the electronic device 101 may normally transfer the message to an application assigned to the top priority, may transfer the message, transferred to the application with the top priority, to an application with the next priority, and may successively transfer the message in the same manner until the message is transferred to an application assigned to the last priority. According to an embodiment of the present disclosure, the electronic device 101 may include at least one sequence filter in which the order of specific applications is set such that a received message is successively transferred in a predetermined order based on the attributes of the message.

Referring to FIG. 3A, in transferring a certain message to another application, the electronic device 101 may successively transfer the message based on priorities assigned for a message filter. In loading applications with assigned priorities into the message filter, the electronic device 101 may invoke the applications in an order specified in the message filter load priority 300. According to an embodiment of the present disclosure, the operation of invoking an application in the message filter of the electronic device 101 may be an operation by which the corresponding application resides at an address of the message filter (e.g., specified location in the memory 130), corresponding to the address assigned for the application, by making reference to information stored in the message filter load priority 300 included in the message filter of the electronic device 101. For example, the electronic device 101 may prioritize a message protection 301, a message application (app) #1 303, a message app #2 305, and other apps and may determine the message protection 301 to be loaded into addresses 000127 and 56021 of the message filter, the message app #1 303 to be loaded into address 000198 of the message filter, and the message app #2 305 to be loaded into address 00777 of the message filter by making reference to information stored in the message filter load priority 300. As described above, the electronic device 101 may allow respective applications to reside in the message filter according to priorities determined based on the message filter load priority 300 and may transfer a message to the applications in such a manner that the message is successively transferred based on the priorities assigned for the message filter.

Referring to FIG. 3B, to transfer a received message to a target application for the message, the electronic device 101 may successively transfer the message to applications corresponding to priorities assigned for the message filter 310 until the message is finally transferred to the target application. According to an embodiment of the present disclosure, the electronic device 101 may receive a message destined for a first application and may transfer the received message to the first application according to application priorities assigned for the message filter 310.

The electronic device 101 may transfer the message to the application (e.g., message protection 301) assigned to a first address 311 based on the priorities assigned for the message filter 310. The electronic device 101 may store the message received by the message protection 301 in a specified location in the memory 130 of the electronic device 101. The specified location in the memory 130 where the message is stored through the message protection 301 may be a memory area that has been secured. The electronic device 101 may transfer the received message to the application assigned to a second address 313 next to the first address 311 in priority, repeat the operation of transferring the received message to the application assigned to the address with the next priority, and finally transfer the received message to the message protection 301 assigned to an Nth address 315 (e.g., address 315 with the lowest priority). The electronic device 101 may compare the message received through the first address 311 of the message filter 310 and stored in the memory 130 with the message received through the Nth address 315 of the message filter 310. When, as a result of the comparison, it is determined that the message has been modified, the electronic device 101 may determine that an application (e.g., malicious application), which modifies a message received by the electronic device 101, is loaded between the first address 311 and the Nth address 315 of the message filter 310. In comparing the message received through the first address 311 and stored in the memory 130 with the message received through the Nth address 315, the electronic device 101 may compare data of the messages with each other so as to determine whether the data are kept identical.

Figure 4A:
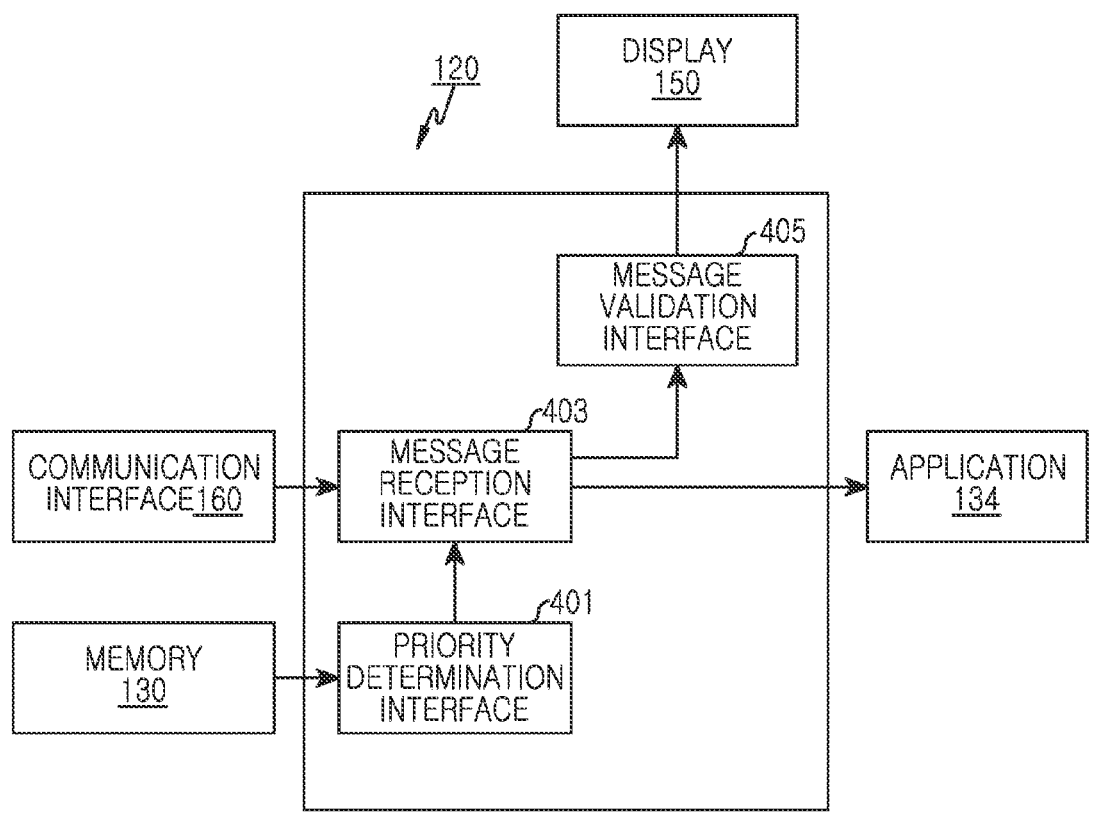
FIGS. 4A and 4B illustrate an operation of determining whether a message received by an electronic device is modified according to various embodiments of the present disclosure.
Figure 4B:
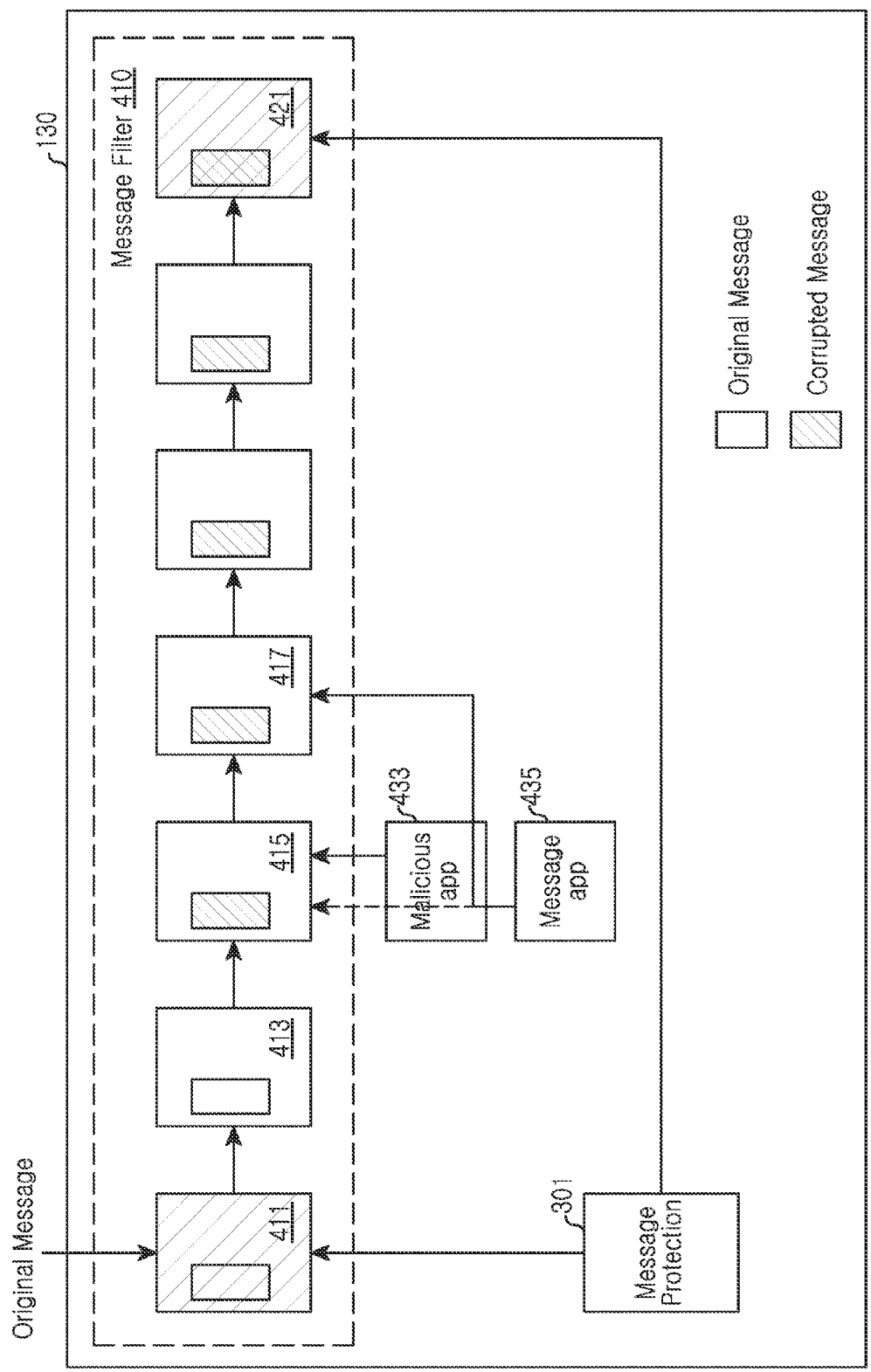

FIGS. 4A and 4B illustrate an operation of determining whether a message received by an electronic device is modified according to various embodiments of the present disclosure.

Referring to FIG. 4A, operations of the processor 120 for implementing various embodiments of the present disclosure are shown using a block diagram. In implementing various embodiments of the present disclosure, the processor 120 may include a priority determination interface 401, a message reception interface 403, and a message validation interface 405.

In the priority determination interface 401, the processor 120 may load at least one application into the message filter based on the message filter load priority included in the memory 130. At the time when at least one application is executed in the booting sequence of the electronic device 101 and information on the executed application is loaded into the memory 130, the electronic device 101 may be operated to load the application into the message filter. Further, when an input for resetting the message filter is detected while the electronic device 101 is operated, the processor 120 may reset the priorities of the applications loaded into the message filter. In loading at least one application into the message filter of the electronic device 101, the processor 120 may load a specified application (e.g., message protection application 134) into at least two addresses of the message filter. In loading the message protection application 134 into the message filter, the processor 120 may load the message protection application 134 into the address corresponding to the top priority of the message filter so that the message protection application 134 first receives a message received by the electronic device 101 and may load the message protection application 134 into a specified address (e.g., the address corresponding to the lowest priority of the message filter) so that the message protection application 134 receives the received message at least once more after having first received the message received by the electronic device 101.

In the message reception interface 403, the processor 120 may successively transfer a message received by the electronic device 101 to applications loaded into the message filter based on transfer priorities assigned for the message filter. According to an embodiment of the present disclosure, the processor 120 may successively transfer a message received by the electronic device 101 according to application priorities assigned for the message filter. First, the processor 120 may transfer a message received by the electronic device 101 to the message protection application 134 corresponding to the top priority assigned for the message filter. Subsequently, the processor 120 may successively transfer the message received by the electronic device 101 according to priorities assigned for the message filter and finally transfer the message received by the electronic device 101 again to the message protection application 134 corresponding to a specified priority of the message filter. The received message transferred by the processor 120 in the message reception interface 403 may be a message that is received from an external electronic device through the communication interface 160 functionally connected to (or included in) the electronic device 101. The processor 120 may store the message, transferred to the message protection application 134 based on the top priority, in a specified location in the memory 130 of the electronic device 101.

In the message validation interface 405, the processor 120 may make a comparison between at least two messages transferred to the message protection application through the message filter. According to an embodiment of the present disclosure, the processor 120 may compare data of the message (e.g., first message or original message) received by the electronic device 101, transferred to the message protection application 134 based on the top priority of the message filter, and stored in the memory 130 with data of the message (e.g., second message) transferred again to the message protection application 134 based on the specified priority of the message filter after the first message has been transferred. In comparing the first message with the second message, the processor 120 may check whether data of the first message is identical to data of the second message. As a result of checking whether data of the first message is identical to data of the second message, the processor 120 may determine that the first message is not identical to the second message and the second message had its data modified (e.g., infected or corrupted). When it is determined that the second message had its data modified, the processor 120 may output a notification, which indicates that the message received by the electronic device 101 has been modified, through the display 150, speaker (e.g., 282 in FIG. 2), and/or motor (e.g., 298 in FIG. 2) of the electronic device 101.

Referring to FIG. 4B, the message filter 410 of the electronic device 101 may contain information on application priorities for successively transferring a message received by the electronic device 101. According to an embodiment of the present disclosure, the message filter 410 of the electronic device 101 may successively load information on applications contained in a message filter load list, which is included in the memory 130 of the electronic device 101, into specified addresses of the message filter 410 according to load priorities in the message filter load list. For example, the electronic device 101 may load information on the message protection application corresponding to the top priority (e.g., a first priority) into a specified address 411 of the message filter 410. The operation of loading information on the message protection application corresponding to the top priority into the message filter 410 may be performed in the security environment that has been set up in the electronic device 101. The electronic device 101 may load information on the application corresponding to the next-to-the-top priority (e.g., a second priority) into a specified address 413 of the message filter 410 and may load information on the message application 435 corresponding to the next-to-the-second priority (e.g., a third priority) into a specified address 415 of the message filter 410. In loading information on a specific application into a specified address of the message filter 410, the electronic device 101 may load information on a first requested application when two or more application information load requests are made for the same address. According to an embodiment of the present disclosure, the electronic device may be requested to load information on the message application 435 into the specified address 415 of the message filter 410 based on information contained in the message filter load list. In loading the information on the message application 435 into the specified address 415 of the message filter 410, the electronic device 101 may first handle a request for loading information on a malicious application 433, which has been made before the request for loading the information on the message application 435 is made, and then load the information on the message application 435 into a specified address 417 next to the specified address 415 in priority. The electronic device 101 may load information (e.g., second load information) on the message protection application 301 into a specified address based on the message filter load list. The electronic device 101 may transfer a received message to the message protection application 301 assigned to the top priority 411 of the message filter. The electronic device 101 may store the received message in the memory 130 (e.g., secured location in the memory 130) of the electronic device 101 (e.g., the message is stored as first message data). The electronic device 101 may transfer the message received by the electronic device 101 to the malicious application 433 while successively transferring the message according to the priorities assigned for the message filter 410, and the malicious application 433 may modify the message received by the electronic device 101 (e.g., the message is modified into second message data). When the electronic device 101 transfers the message received by the electronic device 101 to an application (e.g., the message application 435 capable of processing the message received by the electronic device 101) assigned to the specified address 417 next to the specified address 415 of the message filter 410 in priority, the second message data into which the received message has been modified by the malicious application 433 may be transferred to the message application 435. The electronic device 101 may transfer the message (e.g., the second message data) received by the electronic device 101 to the message protection application assigned to a specified address 421 of the message filter. The electronic device 101 may compare the first message data transferred to the message protection application 301 with the second message data transferred again to the message protection application 301 and, as a result of the comparison, may determine that the first message data has been modified into the second message data. The electronic device 101 may determine that the infected second message data has been transferred to the message application 435 that is specified to process the message (e.g., the first message data) received by the electronic device 101. The electronic device 101 may display a notification, which indicates that the received message (e.g., the first message data) has been modified through the malicious application 433, on the display 150 of the electronic device 101.

Figure 5A:
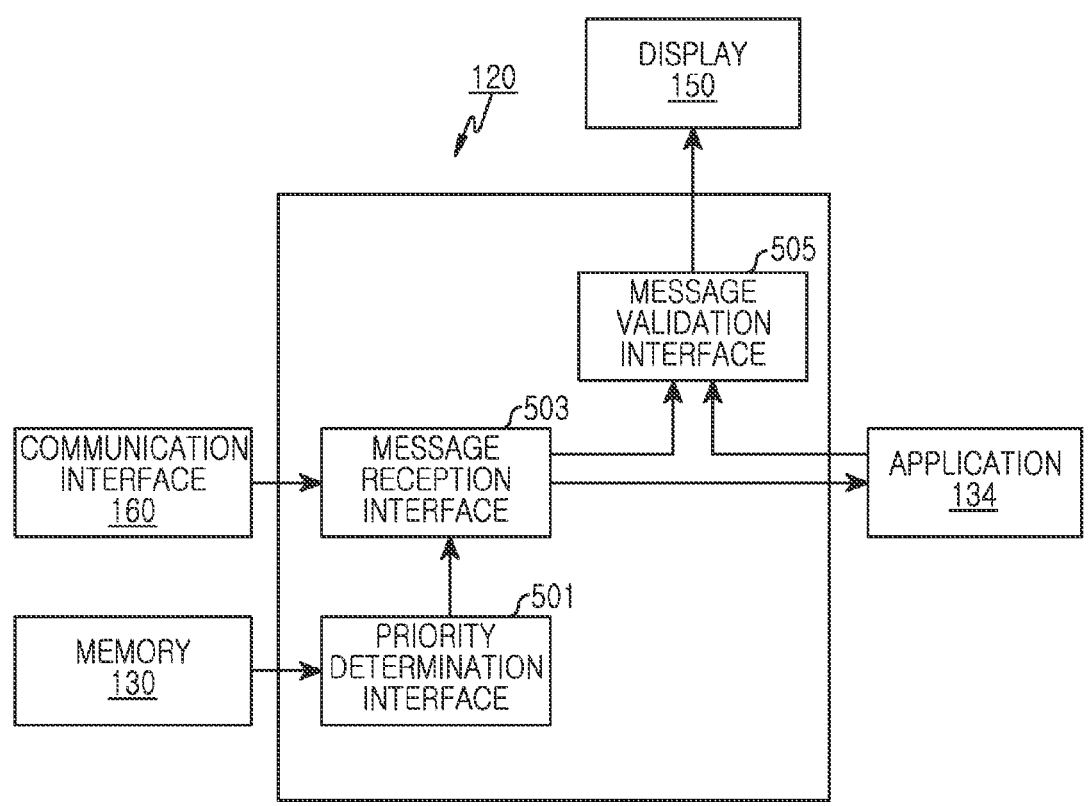
FIGS. 5A and 5B illustrate an operation of determining whether a message received by an electronic device is modified according to various embodiments of the present disclosure.
Figure 5B:
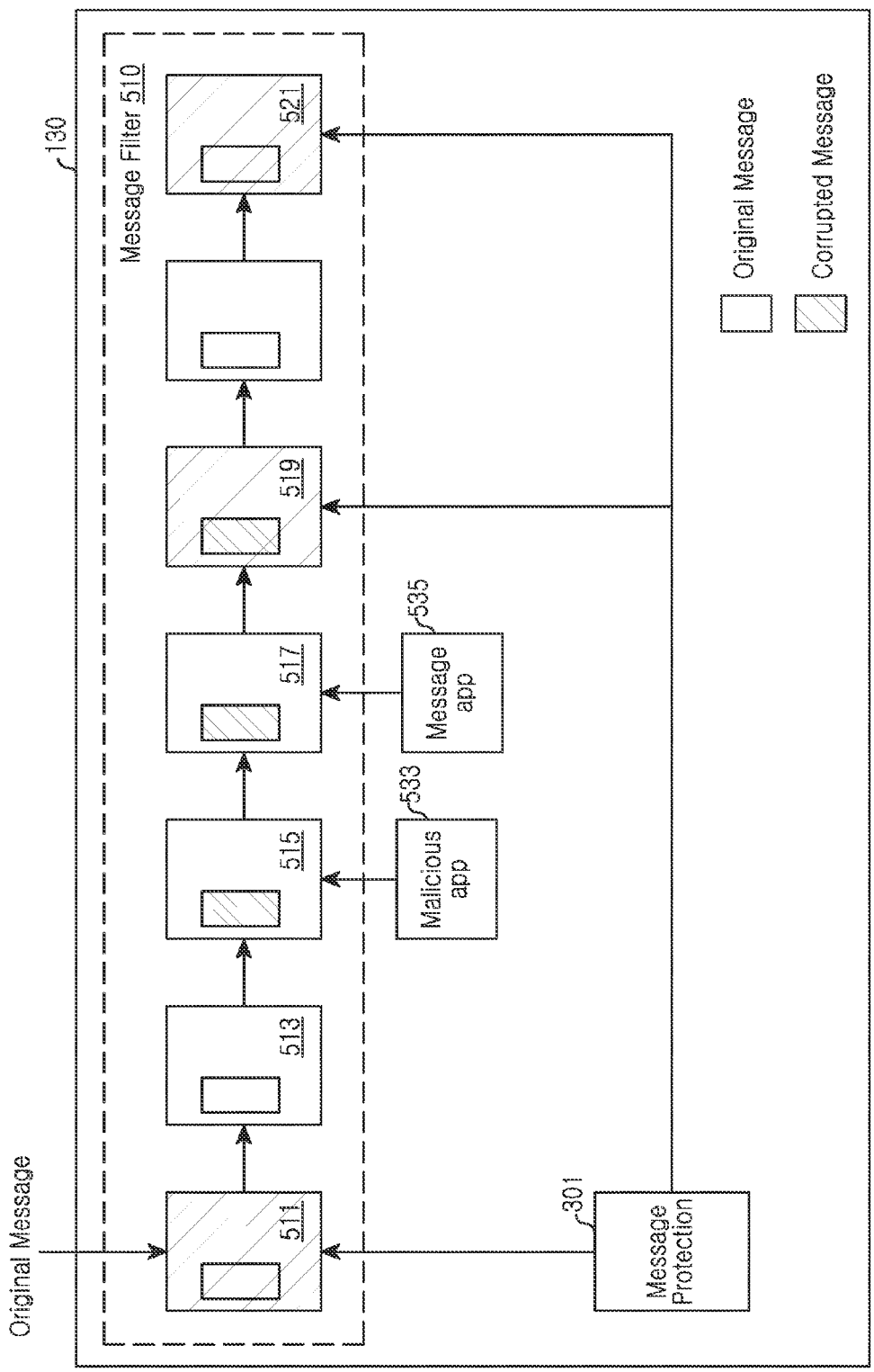

FIGS. 5A and 5B illustrate an operation of determining whether a message received by an electronic device is modified according to various embodiments of the present disclosure.

Referring to FIG. 5A, operations of the processor 120 for implementing various embodiments of the present disclosure are shown using a block diagram. In implementing various embodiments of the present disclosure, the processor 120 may include a priority determination interface 501, a message reception interface 503, and a message validation interface 505.

In the priority determination interface 501, the processor 120 may load at least one application into the message filter based on the message filter load priority included in the memory 130. At the time when at least one application is executed in the booting sequence of the electronic device 101 and information on the executed application is loaded into the memory 130, the electronic device 101 may be operated to load the application into the message filter. Further, when an input for resetting the message filter is detected while the electronic device 101 is operated, the processor 120 may reset the priorities of the applications loaded into the message filter. In loading at least one application into the message filter of the electronic device 101, the processor 120 may load a specified application (e.g., message protection application 134) into at least two addresses of the message filter. In loading the message protection application 134 into the message filter, the processor 120 may load the message protection application 134 into the address corresponding to the top priority of the message filter so that the message protection application 134 first receives a message received by the electronic device 101 and may load the message protection application 134 into a specified address (e.g., the address corresponding to the lowest priority of the message filter) so that the message protection application 134 receives the received message at least once more after having first received the message received by the electronic device 101. In addition, the processor 120 may load information on the message protection application into at least one address between the address corresponding to the top priority of the message filter and the specified address (e.g., address corresponding to the last priority), into each of which the message protection application is loaded based on the message filter load priority included in the memory 130.

In the message reception interface 503, the processor 120 may successively transfer a message received by the electronic device 101 to applications loaded into the message filter based on transfer priorities assigned for the message filter. According to an embodiment of the present disclosure, the processor 120 may successively transfer a message received by the electronic device 101 according to application priorities assigned for the message filter. First, the processor 120 may transfer a message received by the electronic device 101 to the message protection application 134 corresponding to the top priority assigned for the message filter. Subsequently, the processor 120 may successively transfer the message received by the electronic device 101 according to priorities assigned for the message filter and finally transfer the message received by the electronic device 101 again to the message protection application 134 corresponding to a specified priority of the message filter. The received message transferred by the processor 120 in the message reception interface 503 may be a message that is received from an external electronic device through the communication interface 160 functionally connected to (or included in) the electronic device 101. The processor 120 may store the message, transferred to the message protection application 134 based on the top priority, in a specified location in the memory 130 of the electronic device 101.

In the message validation interface 505, the processor 120 may make a comparison between at least two messages transferred to the message protection application through the message filter. According to an embodiment of the present disclosure, the processor 120 may detect data of the message (e.g., first message or original message) received by the electronic device 101, transferred to the message protection application 134 based on the top priority of the message filter, and stored in the memory 130 and may detect data of the message (e.g., second message) transferred again to the message protection application 134 based on the specified priority of the message filter after the first message has been transferred and data of the message (e.g., third message) transferred again to the message protection application 134 based on the specified priority of the message filter after the second message has been transferred. A specific application (e.g., application capable of processing data of a message received by the electronic device 101 or target application for a received message) loaded into the message filter may request the processor 120 to check whether the data of the message received by the target application has been data modified. The processor 120 may compare the second message and/or the third message with the first message thereby determining whether the message received by the target application had the target application's data modified. As a result of comparing data of the first message with data of the second message and or data of the third message, the processor 120 may determine that the first message is not identical to the second message or the first message is not identical to the third message and the second message or the third message had its data modified (e.g., infected or corrupted). When it is determined that the second message or the third message had its data modified, the processor 120 may output a notification, which indicates that the message received by the electronic device 101 has been modified, through the display 150, speaker (e.g., 282 in FIG. 2), and/or motor (e.g., 298 in FIG. 2) of the electronic device 101.

Referring to FIG. 5B, the message filter 510 of the electronic device 101 may contain information on application priorities for successively transferring a message received by the electronic device 101. According to an embodiment of the present disclosure, the message filter 510 of the electronic device 101 may successively load information on applications contained in a message filter load list, which is included in the memory 130 of the electronic device 101, into specified addresses of the message filter 510 according to load priorities in the message filter load list. For example, the electronic device 101 may load information on the message protection application corresponding to the top priority (e.g., a first priority) into the specified address of the message filter 510. The operation of loading information on the message protection application corresponding to the top priority into the message filter 510 may be performed in the security environment that has been set up in the electronic device 101. The electronic device 101 may load information on the application corresponding to the next-to-the-top priority (e.g., a second priority) into a specified address 513 of the message filter 510 and likewise may load information on a malicious application 533 corresponding to the next-to-the-second priority (e.g., a third priority) into a specified address 515 of the message filter 510, information on the message application 535 corresponding to a fourth priority into a specified address 517 of the message filter 510, information on the message protection application 301 corresponding to a fifth priority into a specified address 519 of the message filter 510, and information on the message protection application 301 corresponding to the sixth priority into a specified address 521 of the message filter 510 respectively. The electronic device 101 may transfer a received message to the message protection application 301 corresponding to a top priority 511 of the message filter. The electronic device 101 may store the received message in the memory 130 (e.g., secured location in the memory 130) of the electronic device 101 (e.g., the message is stored as first message data). The electronic device 101 may transfer the message received by the electronic device 101 to the malicious application 533 while successively transferring the message according to the priorities assigned for the message filter 510, and the malicious application 533 may modify the message received by the electronic device 101 (e.g., the message is modified into second message data). When the electronic device 101 transfers the message received by the electronic device 101 to an application (e.g., the message application 535 capable of processing the message received by the electronic device 101) assigned to the specified address 517 next to the specified address 515 of the message filter 510 in priority, the second message data into which the received message has been modified by the malicious application 533 may be transferred to the message application 535.

The electronic device 101 may detect a request for checking whether the second message had its data modified, which is made to the message protection application 301 by the message application 535 that has received the second message. The electronic device 101 may compare data of the first message received by the message protection application 301 based on the message filter 510 with data of the message received by the message protection application 301 following the message application 535 based on the message filter 510. For example, the electronic device 101 may transfer the message (e.g., the second message data) received by the electronic device 101 to the message protection application assigned to the specified address 519 of the message filter. The electronic device 101 may compare the first message data transferred to the message protection application 301 with the second message data transferred again to the message protection application 301 and, as a result of the comparison, may determine that the first message data has been modified into the second message data. The electronic device 101 may determine that the infected second message data has been transferred to the message application 535 that is specified to process the message (e.g., the first message data) received by the electronic device 101. The electronic device 101 may determine, based on the second message data received through the specified address 519 of the message filter, that the first message has been modified by any application loaded between the specified address 511 and the specified address 519 of the message filter where the message protection application 301 is loaded.

The electronic device 101 may display a notification, which indicates that the received message (e.g., the first message data) has been modified through the malicious application 533, on the display 150 of the electronic device 101. The electronic device 101 may increase the reliability of determining the location where the malicious application 533 operates by determining at least one address between the specified addresses (e.g., the addresses 511 and 521) occupied by the message protection application 301 corresponding to two or more priorities based on the message filter and additionally loading information on the message protection application 301 into the determined address of the message filter.

Figure 6:
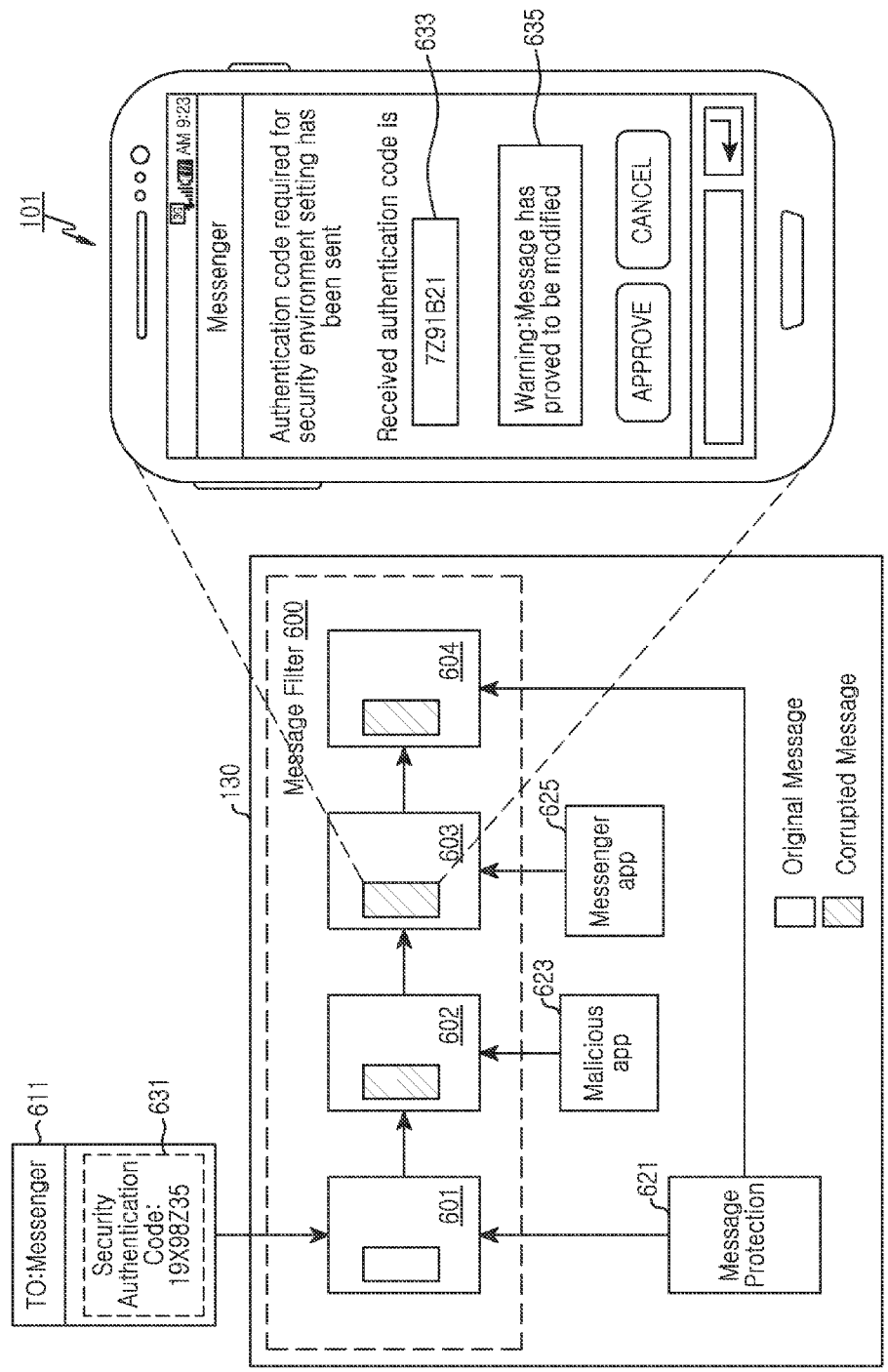
FIG. 6 illustrates an example in which, when a message received by an electronic device is modified, a notification indicating that the message has been modified is output according to various embodiments of the present disclosure.

FIG. 6 illustrates an example in which, when a message received by an electronic device is modified, a notification indicating that the message has been modified is output according to various embodiments of the present disclosure.

Referring to FIG. 6, the electronic device 101 may load information on a message protection application 621 into a specified address 601 corresponding to the top priority of a message filter 600 in which priorities for transferring a message received by the electronic device 101 are specified based on the message filter load list and may further load information on the message protection application 621 into a specified address corresponding to the last priority of the message filter 600. The electronic device 101 may load information on a messenger application 625 into a specified address 603 corresponding to a priority between the specified address 601 and a specified address 604 of the message filter 600. Upon receiving a message destined for the messenger application 625, the electronic device 101 may store a message 611, received through the message protection application 621 based on the priorities assigned for the message filter 600, in a specified location in the memory 130 and may successively transfer the message to applications corresponding to subsequent priorities. The electronic device 101 may transfer, to the messenger application 625, a message 602 that has been modified by a malicious application 623 loaded into a specified address corresponding to a higher priority than the messenger application 625 based on the message filter 600 (e.g., message into which the message 611 has been modified). According to an embodiment of the present disclosure, the electronic device 101 may display authentication code 7Z91B21 633, modified by the malicious application, on the display 150 based on the modified message. The electronic device 101 may detect a request from the messenger application 625 to check whether there is any modification in information on the message displayed on the display 150. The electronic device 101 may the modified authentication code 7Z91B21 633 received by the messenger application 635 with authentication code 7X98Z35 631 contained in the received message 611 and, as a result of the comparison, may determine that the authentication codes are not identical to each other. The electronic device 101 may display a notification 635, which indicates that the received message has been modified, on the display where the operation of the messenger application is displayed.

Figure 7:
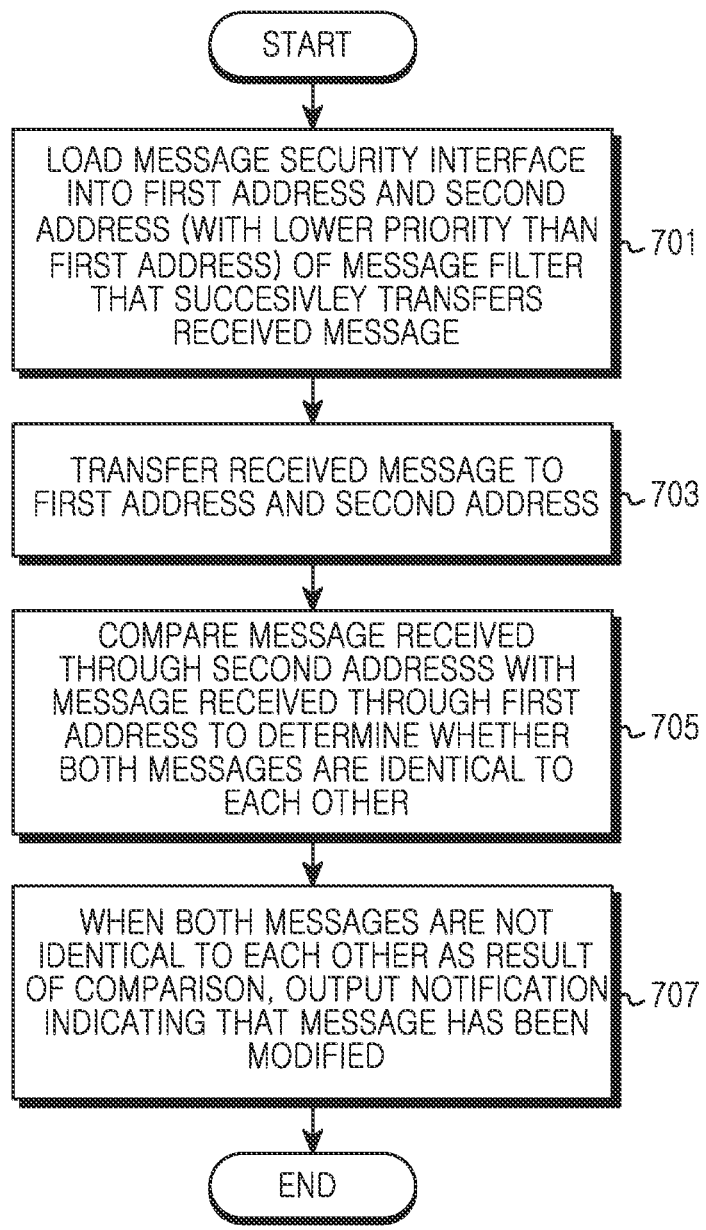
FIG. 7 is a flowchart illustrating an operation of determining whether a message received by an electronic device is modified according to various embodiments of the present disclosure.

FIG. 7 illustrates an operation of determining whether a message received by an electronic device is modified according to various embodiments of the present disclosure.

Referring to FIG. 7, in operation 701, the electronic device 101 may load a message security interface (e.g., message protection application) into at least two specified addresses (e.g., first and second addresses) of the message filter so as to successively transfer a received message in a predefined order. The message protection application of the electronic device 101 may be an application which is loaded into at least two addresses of the message filter and thus to which a message received by the electronic device 101 is transferred at least twice, and which compares data of at least two transferred messages with each other, thereby determining whether the message received by the electronic device 101 has been modified. Information on at least one application with a lower priority than the application loaded into first address and a higher priority than the application loaded into the second address may be loaded between the first address and the second address of the message filter of the electronic device 101.

In operation 703, the electronic device may successively transfer a message received by the electronic device 101 based on message transfer priorities assigned for the message filter. The electronic device 101 may transfer the received message (e.g., first message data) to the message protection application assigned to the first address corresponding to a first priority of the message transfer priorities, may transfer the message to the target application for the message received by the electronic device 101, corresponding to the next-to-the-first priority, and may transfer the message (e.g., second message data) to the message protection application corresponding to the second address by making reference to the priorities assigned for the message filter.

In operation 705, the electronic device 101 may determine whether the received message has been modified in the process of successively transferring the message to the applications according to the priorities assigned for the message filter. According to an embodiment of the present disclosure, when the message protection application receives the message (e.g., first message data) through the address where the message protection application is loaded the last time based on the message filter or when the target application for the message receives the corresponding message (e.g., second message data) and the electronic device 101 receives, from the target application, a request for checking whether the message has been modified, the electronic device 101 may compare the message (e.g., third message data) stored in a specified location in the memory 130 with the first or second message data, thereby determining whether the third message data is identical to the first or second message data or has been modified.

In operation 707, when, as a result of the comparison in operation 703, the electronic device 101 determines that the first message data or the second message data is not identical to the third message data, a notification indicating that the received first or second message has been modified may be output through the electronic device 101. According to an embodiment of the present disclosure, while the display 150 displays the message through the target application that processes the received message, the electronic device 101 may display a notification message, which indicates that the displayed message had its data modified, on a part of the display 150 and may output a predetermined notification message through the speaker or motor of the electronic device 101. In addition, the electronic device 101 may display the original message (e.g., first message) received by the electronic device 101 on a part of the display 150 that is displaying the message through the target application.

Upon completing operation 707, the electronic device 101 may end the embodiment of the present disclosure shown in FIG. 7.

Various embodiments of the present disclosure as described above may be implemented by at least one of one or more programs included in the memory of the electronic device 101, one or more processors (e.g., the processor 210), and modules that perform operations corresponding to various embodiments of the present disclosure.

According to various embodiments of the present disclosure, at least some of the devices or methods according to various embodiment of the present disclosure as defined by the appended claims and/or disclosed herein may be implemented in the form of hardware, software, firmware, or any combination (e.g., module or unit) of at least two of hardware, software, and firmware. The module may be the smallest unit of an integrated component or a part thereof and may also be the smallest unit that performs various embodiments of the present disclosure or a part thereof. The module may be mechanically or electronically implemented. If implemented in software, a computer-readable storage medium (or storage medium readable by a computer) storing at least one program (or programming module) may be provided. The software may, for example, be implemented by instructions stored in a computer-readable storage medium in the form of a programming module. The at least one program may include instructions that cause the electronic device to perform the methods according to various embodiments of the present disclosure as defined by the appended claims and/or disclosed herein. The instructions, when executed by at least one processor (e.g., the processor 210), enables the at least one processor to perform functions corresponding to the instructions. The computer-readable storage medium may, for example, be the memory 230. At least a part of the programming module may, for example, be implemented (e.g., executed) by the processor 210. At least a part of the programming module may, for example, include a module, a program, a routine, a set of instructions, or a process for performing at least one function.

According to various embodiments of the present disclosure, the electronic device 101 may include a computer-readable storage medium storing a program that performs the operations of successively transferring a received message, based on a sequence filter; and determining whether data of the message successively transferred to the sequence filter are identical to each other.

The computer-readable storage medium may include magnetic media such as a hard disc, a floppy disc, and a magnetic tape; optical media such as a compact disc ROM (CD-ROM) and a DVD; magneto-optical media such as a floptical disk; a hardware device specifically configured to store and execute program instructions (e.g., programming module), such as a ROM, a RAM, and a flash memory; an EEPROM; a magnetic disc storage device; any other type of optical storage device; and a magnetic cassette. Alternatively, any combination of some or all of the may form a memory in which the program is stored. Further, a plurality of such memories may be included in the electronic device.

In addition, the program may be stored in an attachable storage device capable of accessing the electronic device through a communication network such as the Internet, an intranet, a local area network (LAN), a wide LAN (WLAN), a storage area network (SAN), or any combination thereof. Such a storage device may access the electronic device via an external port. Further, a separate storage device on the communication network may access a portable electronic device. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed in a different order, some of the operations may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method comprising:
successively transferring, via at least one processor, at least two received messages in a sequence filter;
determining, via the at least one processor, whether data of the at least two received messages are identical to each other; and
outputting, via the at least one processor, when it is determined the at least two received messages are not identical to each other, a message indicating that one of the two received messages has been modified.

2. The method of claim 1, wherein a first priority and a second priority having a lower priority than the first priority in the sequence filter are occupied by the same program.

3. The method of claim 2, wherein the first priority corresponds to a top priority of the sequence filter, and the second priority corresponds to a last priority of the sequence filter.

4. The method of claim 1, wherein the determining of whether the data of the at least two received messages are identical to each other comprises determining whether the data of the at least two received messages are identical to each other according to a request of a specific program occupied between a first priority and a second priority of the sequence filter.

5. The method of claim 2, wherein at least one of the at least two received messages or a message transferred corresponding to the first priority is stored in a secured area in a memory.

6. The method of claim 2, wherein the data of the at least two message messages comprise first data of a first message transferred to the program corresponding to the first priority and second data of a second message transferred to the program corresponding to the second priority.

7. The method of claim 6, wherein the determining of whether the data of the at least two received messages are identical to each other comprises determining whether the second data is identical to the first data.

8. The method of claim 7, further comprising determining, when the program occupies a third priority satisfying a lower priority than the first priority and a higher priority than the second priority in the sequence filter, whether third data of a message transferred to the program corresponding to the third priority is identical to the first data.

9. The method of claim 1, further comprising displaying a result of the determination on a display.

10. The method of claim 9, wherein the displaying of the result of the determination further comprises displaying the original copy of the at least two received messages.

11. An electronic device comprising:
a communication interface configured to receive at least two messages; and
at least one processor configured to:
successively transfer the at least two received messages in a sequence filter,
determine whether data of the at least two received messages are identical to each other, and
output, when it is determined the at least two received messages are not identical to each other, a message indicating that one of the two received messages has been modified.

12. The electronic device of claim 11, wherein a first priority and a second priority having a lower priority than the first priority in the sequence filter are occupied by the same program.

13. The electronic device of claim 12, wherein the at least one processor is further configured to:
determine the first priority as the top priority of the sequence filter, and
determine the second priority as the last priority of the sequence filter.

14. The electronic device of claim 11, wherein the at least one processor is further configured to determine whether the data of the at least two received messages are identical to each other according to a request of a specific program occupied between a first priority and a second priority of the sequence filter.

15. The electronic device of claim 12, wherein the at least one processor is further configured to store, in a secured area in a memory, at least one of the received messages of the at least two received message or a message transferred corresponding to the first priority.

16. The electronic device of claim 12, wherein the data of the at least two received messages comprise first data of a first message transferred to the program corresponding to the first priority and second data of a second message transferred to the program corresponding to the second priority.

17. The electronic device of claim 16, wherein the at least one processor is further configured to determine whether the second data is identical to the first data.

18. The electronic device of claim 17, wherein, when the program occupies a third priority satisfying a lower priority than the first priority and a higher priority than the second priority in the sequence filter, the at least one processor is further configured to determine whether third data of a message transferred to the program corresponding to the third priority is identical to the first data.

19. The electronic device of claim 11, wherein, the at least one processor is further configured to display a result of the determination on a display.

20. The electronic device of claim 19, wherein the at least one processor is further configured to display the original copy of the at least two received messages on the display.

* * * * *